United States Patent
Estinto

(12) 
(10) Patent No.: US 6,411,797 B1
(45) Date of Patent: Jun. 25, 2002

(54) METHOD AND APPARATUS FOR PERFORMANCE CHARACTERIZATION OF SATELLITE TRANSPONDERS

(75) Inventor: Eugene Estinto, Leesburg, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/716,905

(22) Filed: Sep. 20, 1996

(51) Int. Cl.[7] .............................................. H04B 1/60
(52) U.S. Cl. ........................................ 455/9; 455/67.3
(58) Field of Search ............................. 455/12.1, 13.1, 455/13.4, 9, 24, 67.3, 21, 22, 63, 67.1, 67.7, 68, 71, 226.1, 67.6; 375/324, 228, 295, 296

(56) References Cited

U.S. PATENT DOCUMENTS

| | | | | |
|---|---|---|---|---|
| 4,038,600 A | * | 7/1977 | Thomas ........................ | 455/9 |
| 4,910,791 A | * | 3/1990 | Dickinson et al. ............. | 455/9 |
| 5,099,200 A | * | 3/1992 | Tarantino et al. ........... | 324/619 |
| 5,404,375 A | * | 4/1995 | Kroeger et al. ............. | 375/200 |
| 5,668,795 A | * | 9/1997 | Magill et al. ................ | 370/209 |

* cited by examiner

Primary Examiner—Daniel Hunter
(74) Attorney, Agent, or Firm—Jim Zegeer

(57) ABSTRACT

Method and apparatus for performance characterization of Ka band transponders wherein measurements are made. A wideband modulated data signal is used to test the response of the Ka band transponder. A periodic test pattern, preferably a pseudo-noise (PN) sequence, modulated on a carrier, is transmitted to an onboard satellite transponder which then retransmits the signal to a receiver where a down converter is used to output inphase and quadrature phase baseband signals which are digitized and used for measuring one or more of the following:

Magnitude and phase response
AM/AM and AM/PM
Phase noise
Bit error rate
Data asymmetry
I/Q channel imbalance.

7 Claims, 6 Drawing Sheets k = sequence length
m = # of samples/symbol
T = symbol duration

—— ACC (Valid over [-0.9, 0.9])
------ Swept
Testbed (-20 dB Backoff)
Swept
Tilt = -0.459 dB
Ripple = 1.51 dB ACC
Tilt = -0.384 dB
Ripple = 1.75 dB
90% RMS Error = 0.22 dB R = 400 Mbps (BPSK)
PN length = 127

METHOD AND APPARATUS FOR PERFORMANCE CHARACTERIZATION OF SATELLITE TRANSPONDERS

BACKGROUND OF THE INVENTION

The demands for radio frequency spectrum and increased channel throughput have forced satellite designers to operate over increasingly band limited channels. Bandwidth efficient modulation is now a necessity and requires that more attention be paid to link distortion effects. This becomes particularly important when Traveling Wave Tube Amplifiers (TWTAs) are operated at or near saturation on the spacecraft. The present invention is directed to method and apparatus for measuring such distortions, and monitor on-orbit Ka band transponder performance.

Transponder distortions associated with the use of TWTAs can be separated into two categories: linear effects and non-linear effects. Linear effects include such distortions as tilt and ripple across the TWTA operating bandwidth. Non-linear effects include such distortions as Amplitude to Amplitude Conversion (AM/AM) and Amplitude to Phase conversion (AM/PM), which occur when fluctuations in the modulated signal envelope are present. These fluctuations are directly related to the degree of channel band limiting present on the link and the modulation format. Both types of distortion affect the overall link performance. It is therefore desirable to obtain an accurate characterization of the transponder's behavior, particularly at saturation.

Conventional approaches for satellite transponder characterization focus on the pre-flight measurement of individual subsystem distortion parameters and use such measurements in a "system" model to predict end-to-end link performance. Such techniques typically involve considerable investments in test equipment and time, and require elaborate test procedures. Most of these tests typically do not employ actual wideband signals, nor do they necessarily treat the satellite transponder as a whole. Typically, a "narrowband" swept tone response is used to measure many of the desired parameters. Due to the inherent non-linearity of TWTAs, however, such techniques will not produce an accurate characterization at saturation. The transponder characterization, and the model which arises, may not fully reflect the composite interactions of transponder distortions on key performance parameters, e.g. Bit Error Rate (BER). In this sense, measurement techniques which employ wideband test signals, and are capable of treating the transponder as a single unit, are highly desirable.

The requirement to have access to internal inputs and outputs when utilizing conventional approaches also limits the degree of resting which can be performed at the system level (integrated transponder) to measure distortion parameters. Conventional system level tests are therefore primarily limited to functional capability and overall BER performance.

Over the last few years, several efforts of applicant's assignee have resulted in the development of a cost effective hardware test set capable of characterizing non-linear transponders. The Advanced Channel Characterization (ACC) system is capable of measuring, among other parameters, the effective linearized frequency response of a saturated transponder. The technique can be used with engineering models, brass boards, and flight hardware in the laboratory, and can also be used on-orbit. The approach uses a modulated data sequence representative of actual data, therefore occupying the entire transponder bandwidth. The technique has been successfully validated in hardware tests at both Ku and Ka band, and at bandwidths up to 1 GHz. The present invention concentrates on the frequency response measurement capabilities of the ACC device.

The object of the invention is to provide method and apparatus for performance characterization of satellite transponders, and in general the characterization of communication system elements and RF networks exhibiting either linear or non-linear transfer functions.

Another object of the invention is to provide method and apparatus for performance characterization of Ka band transponders.

DESCRIPTION OF THE DRAWINGS

The above and other objects, advantages and features of the invention will become more clear when considered with the following specification and accompanying drawings wherein.

DETAILED DESCRIPTION OF THE INVENTION

Figure 1:
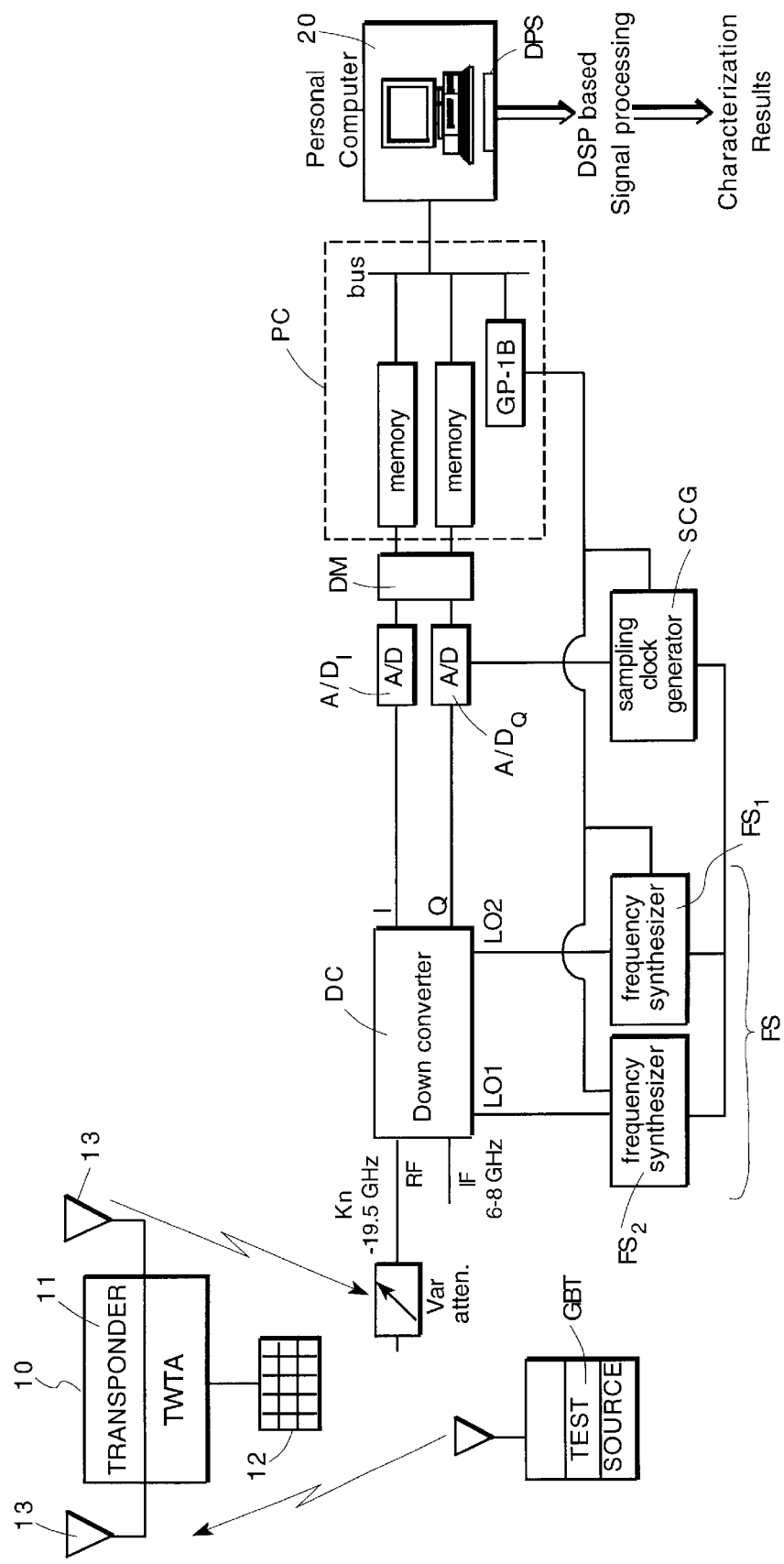
FIG. 1 is a block diagram of an advanced channel characterization system incorporating the invention.

The ACC system can be viewed as a sophisticated network analyzer capable of measuring, among many parameters, a linearized frequency response (magnitude and phase) of the device under test. The measurements are made using a wideband modulated data signal as opposed to a swept tone. FIG. 1 illustrates an orbiting satellite 10 having a transponder 11, solar panels 12, antennas 13. Transponder 11 has an onboard traveling wave tube amplifiers (TWTA) which can be operated at or near saturation. A periodic test pattern, using a Pseudo-Noise (PN) sequence, is necessary as the input data signal. This is provided by a ground-based test transmitter GBT. A short burst of data is collected to obtain the measurements. The system hardware comprises a Downconverter DC, a Digitizing Module DM, a Processing Module PM and External Frequency Synthesizers FS.

The basic system architecture is illustrated in FIG. 1. The downconverter DC accepts an input signal at either RF or IF, and converts it to baseband I and Q components. The baseband signal is then digitized using a high speed analog-to-digital converter $A/D_I$ and $A/D_q$, and stored on a high speed memory card MC resident in a PC. The A/D module has 8 bits of quantization, and a bandwidth in excess of 1.5

GHz. Up to 32 Mbytes of data may be collected and stored in the memory cards MC at a time. Once acquired, the raw data is read from the memory card via computer 20 and processed in near real time using an embedded digital signal processing card DPS. Sampling clock generator SCG supplies sampling pulses to the analog-to-digital converter $A/D_I$ and $A/D_Q$. One or more frequency synthesizer $FS_1$ and $FS_2$ are used to provide downconverter DC with signals $LO_2$ and $LO_1$, ($LO_1$ is only needed in the IF mode of operation). In the preferred embodiment, all carrier tracking, symbol tracking, and characterization functions are performed in software, making the system extremely flexible in regards to the signal modulation format and input data rate. Computing the frequency response of the device under test currently takes on the order of 1–2 minutes.

All ACC system functions, from data acquisition to the displaying of results, are controlled through a Windows™ based user interface. The system remotely controls all supporting hardware via a GP-IB interface. The characterization results are displayed on the user monitor, and can also be stored for later use. The graphic display has the ability to perform linear and cubic curve fits of individual results, and allows overlaying of multiple results. Measurement plots may be sent to a printer (not shown) if desired.

Measurement Technique

The measurement technique uses the transponder's RF output signal, in conjunction with knowledge of the input signal, as the source for its characterization processing. This non-invasive feature of the system greatly enhances system level testing by providing distortion data even after the transponder has been integrated as a flight unit. This "black box" concept also allows for continued transponder characterization once the satellite is on-orbit via the use of a specific test signal.

Accurate knowledge of the baseband I and Q waveforms is required by the measurement technique. To properly capture the signal, on the order of 10 samples per symbol are required. For the case of high data rate signals, waveform acquisition would require very sophisticated and costly test equipment.

Figure 2:
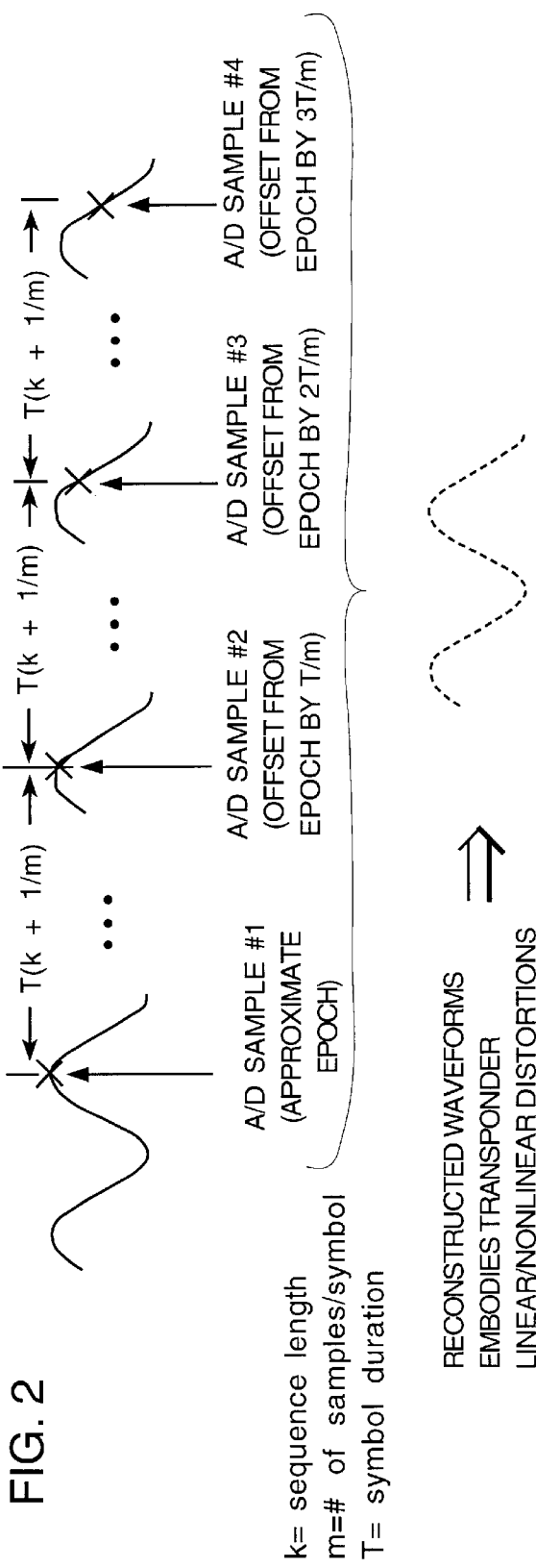
FIG. 2 is an illustration of waveform via sub-sampling.

In order to minimize the use of high speed hardware, a novel approach has been developed to accurately reconstruct the received waveforms via a sub-sampling technique. The process requires that the input signal be periodic, and that its pattern be known. Both these conditions are met when using a PN sequence pattern generator. By carefully selecting the sampling instants, the entire test pattern waveform can be recovered via a strobbing technique. This concept is illustrated in FIG. 2 for the case of a filtered BPSK square wave pattern. Note that the successive samples, although taken from different symbols, perfectly trace out the original waveform. Typical data collections using the ACC system have been performed using a 32 samples/symbol setting.

Any variations to the waveform due to time invariant channel distortions will also be reconstructed by this process provided that the sample aperture window is sufficiently short. This means that the input bandwidth of the A/D's track and hold circuit must exceed the channel bandwidth and that the A/D aperture time must be a small fraction of a symbol (or bit) duration. Any time varying distortion phenomena will still be subject to the Nyquist criterion, and will be captured as long as their time constants fall below the system sub-sampling rate. Assuming a sub-sampling rate of about 3 MHz, any time-varying characteristics with frequencies up to about 1.5 MHz would be recoverable. It is expected that channel time-varying phenomena (e.g. phase noise) are limited to less than a MHz.

A modulated Pseudo-Noise sequence of length 127 has been selected as the primary test input signal for the ACC system. For the case of a PN127 sequence at a data rate R of 400 Mbps, the desired A/D sampling clock to obtain 32 samples/bit is determined as follows:

$$F_s = \frac{m \cdot R}{k \cdot m + 1} \quad F_s = \frac{32 \cdot 400}{127 \cdot 32 + 1} \quad F_s = 3.148831 \text{ MHz}$$

The frequency response measurement is a differential measurement obtained by different comparison of the output signal from a device under test with a reference signal. In the example shown in FIG. 3, the modulator output x(t) corresponds to the reference signal, and y(t) is the output signal. The reference signal and output signal measurements are not collected simultaneously. It is assumed that the modulator output remains sufficiently stable in between the two measurements.

Figure 3:
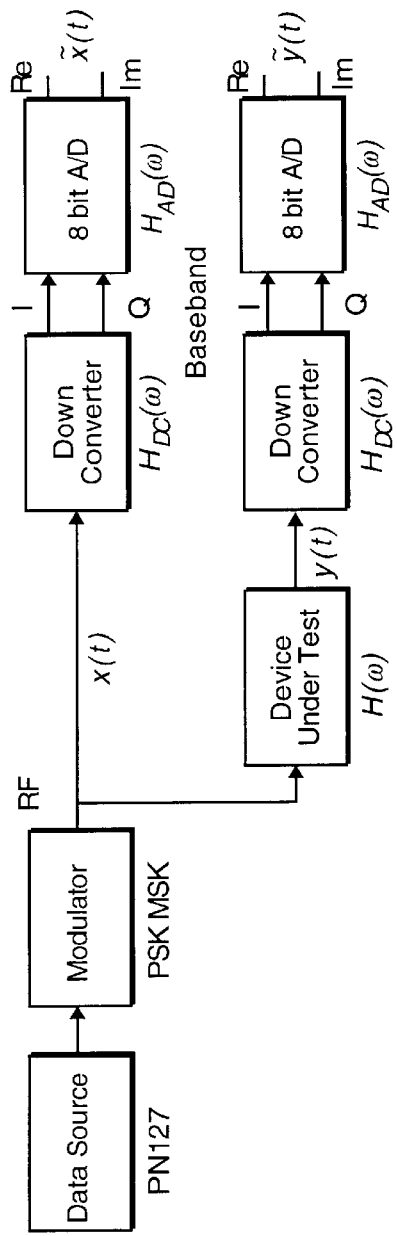
FIG. 3 is a block diagram of a sample test configuration.

The signals shown in FIG. 3 are related as follows assuming a linear system:

$$x(t) \xleftrightarrow{F.T.} X(\omega) \qquad \tilde{x}(t) \xleftrightarrow{F.T.} \tilde{X}(\omega)$$

$$y(t) \xleftrightarrow{F.T.} Y(\omega) \qquad \tilde{y}(t) \xleftrightarrow{F.T.} \tilde{Y}(\omega)$$

$$\tilde{X}(\omega) = X(\omega) \cdot H_{DC}(\omega) \cdot H_{AD}(\omega)$$

$$\tilde{Y}(\omega) = Y(\omega) \cdot H_{DC}(\omega) \cdot H_{AD}(\omega)$$

$$Y(\omega) = X(\omega) \cdot H(\omega) \quad \Rightarrow \quad \frac{\tilde{Y}(\omega)}{\tilde{X}(\omega)} = \frac{Y(\omega)}{X(\omega)} = H(\omega)$$

The desired frequency response $H(\omega)$ is obtained by transforming both x(t) and y(t) to the frequency domain and then taking the ratio of their frequency domain representations. The contribution to the measurement from the ACC system's own hardware cancels out. The above technique can be applied to a non-linear system to yield a linearized version of the systems transfer function for a given input power level. It is very important to point out that when measurements include non-linear devices at or near saturation, the linearized response is only valid for the particular input spectrum used. In other words, the measurement is only applicable for the specific data rate, power level, and modulation format used—all variables which affect the input signal spectrum. As long as the test input signal is representative of an actual data signal, the results obtained using this technique remain valid. A PN sequence has the property that its power spectrum resembles that of random data. Experimental results have shown that the technique is insensitive to PN sequence pattern (i.e., the specific generator polynomial) or PN sequence length (e.g. PN127 vs. PN255) once above a certain point. Measurement results obtained using a PN sequence can therefore be extended to the case of random input data.

The example shown above is just one of many possible test scenarios. The key concept is that the measurement technique always yields the difference between two signals x(t) and y(t). These two signals could correspond to the co-pol and x-pol channels of a dual polarization system, or they could represent the receiver's output during clear weather and during a rain event respectively. In this latter case, the measurement would correspond to the rain's attenuation as a function of frequency.

Currently, the ACC system is compatible with BPSK, QPSK, SQPSK and MSK modulation formats, and can operate at data rates up to 1 GSPS. It is capable of performing the following measurements:

Magnitude and phase response

AM/AM and AM/PM (requires stepping of input power)

Phase noise

Bit error rate

Data asymmetry

I/Q channel imbalance

SYSTEM APPLICATIONS

Several phases of the conventional transponder test cycle which would benefit from this new measurement capability have been identified. These applications span from ground based system level testing to on-orbit characterization.

System Level Testing

The principal role envisioned during system level testing is to augment conventional factory measurement capabilities during periods of limited test access to the transponder. Such added capabilities have the potential for streamlining the test process and reducing associated program costs.

Under the proposed testing approach, measurements would be collected, processed, and correlated with factory measurements during subsystem testing and initial phases of system testing. The purpose of the correlation process would be to set up a valid reference baseline to be used against future measurements. This "reference" characterization would then be compared with later results to determine whether any deviations from the norm have occurred. This capability would be extremely useful in circumstances where full conventional system characterization is usually not available, such as during thermal vacuum testing. Being able to monitor distortion parameters versus temperature after the unit has been integrated into its flight configuration holds many potential benefits. For example, deviations from applicable distortion specifications, which may be readily evident through BER monitoring alone, could be detected.

Pre-ship testing and launch base testing could also be streamlined by using the proposed characterization technique to conduct many of the required tests. The purpose of these tests is to determine whether any deviations from previously measured performance have occurred. Any apparent deviations in the ACC measured output response would imply a corresponding drift in factory measurement parameters.

On-Orbit Measurements

Current on-orbit test capability is mostly limited to bit error rate performance. These measurements can be taken by transmitting a known data sequence, or can be collected by monitoring frame synchronization words in the received data stream. These techniques may be adequate for monitoring overall channel performance in current systems, but do not provide much insight into distortions related to equipment aging. Using the technique described herein, additional valuable parameters such as frequency response (gain and phase), AM/AM and AM/PM, system phase noise, and an additional bit error rate estimate would become available. Monitoring of these parameters over time may permit prediction of impending failures and performance degradation. Such knowledge would be valuable in reducing service downtime, and would provide useful reliability data for future spacecraft payloads.

FREQUENCY RESPONSE ALGORITHM

Figure 4:
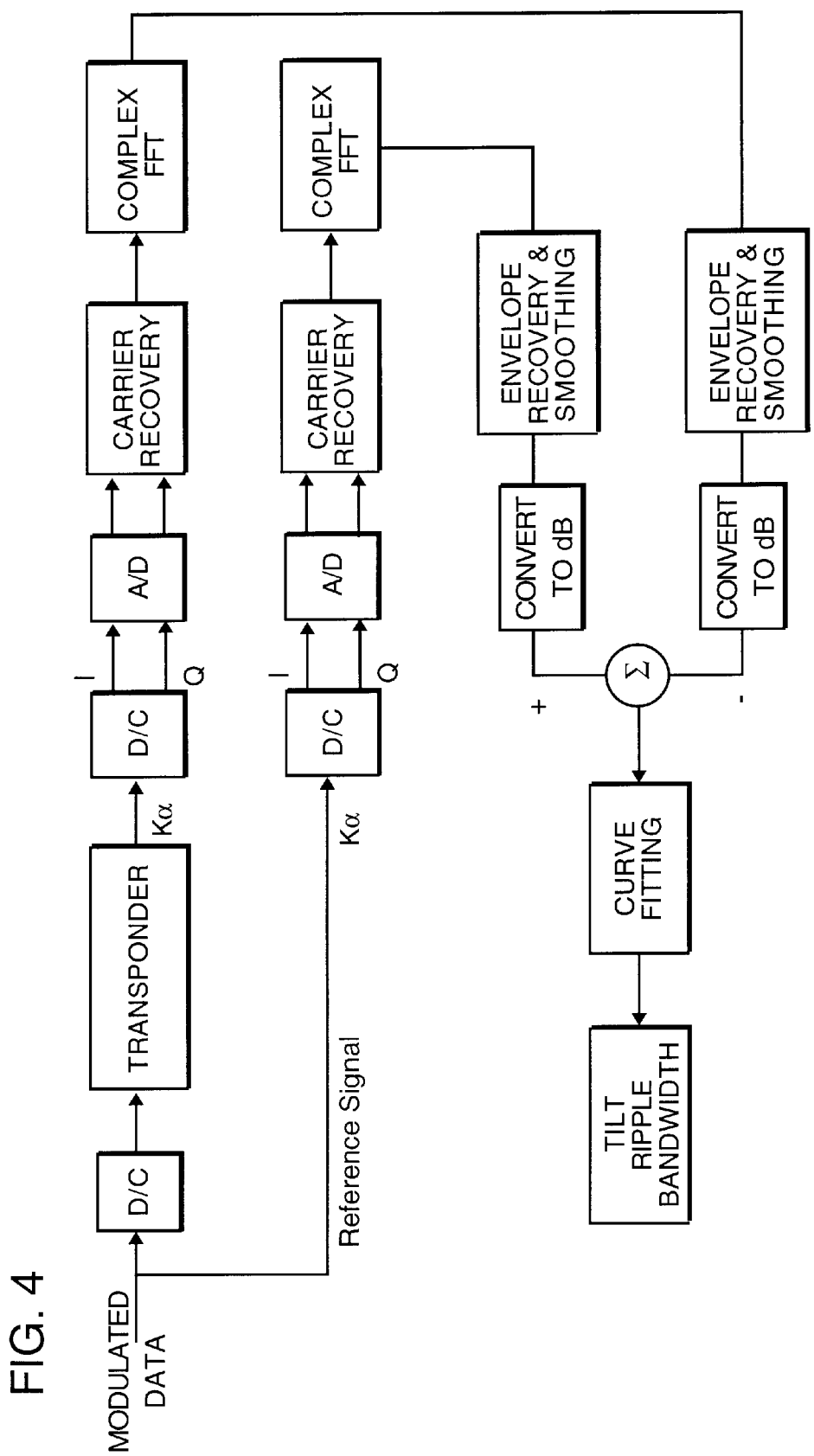
FIG. 4 is a block diagram of an advanced channel characterization system for magnitude response measurement.

The approach to measuring the transponder's overall gain response is based on spectral comparison between the known input signal and the output signal from the transponder under test. Any changes between the two spectra can be attributed to the transponder. Since the waveforms are acquired at baseband, complex Fourier analysis is required to maintain a distinction between positive and negative spectrum frequencies. This means that the I and Q channels are used together, as real and imaginary parts, in computing all FFTs. The ACC magnitude response algorithm is summarized in FIG. 4.

In this example, an external modulated data source at Ka band is assumed. The input "reference signal" and the transponder output are both treated equally by the system. This is essential to remote any signal distortions introduced by the system itself by either the downconverter or A/D module. Any discrepancies between the reference and output waveforms can then be attributed to the transponder's response and the upconverter used to translate the reference signal to the transponder's input frequency. The frequency response of this latter component is assumed to be either negligible or known so that it may be later subtracted out.

Both the reference signal and the test signal are typically reduced to 8 samples per symbol. This can be done either by decimating and sub-sampled waveform (nominally 32 sps) or by adjusting the A/D sampling clock to yield only 8 samples/symbol. The first case is preferred since additional SNR gain is possible by averaging neighboring samples during decimation. Several entire periods of the 127 length PN data sequence are collected and are then averaged to obtain a single sequence. This procedure is done for both the reference and output waveforms. Each sequence should result in a total of about 1016 data points, depending on the accuracy of the sampling clock. A Fourier Transform is then computed from each reconstructed waveform, resulting in a frequency spectrum spanning ±4R, where R represents the transmitted symbol rate.

Once the spectra of the reference and test signals have been obtained, they are passed through a smoothing routine to recover each spectrum's envelope, and reduce the effects of noise. A sliding window average of 10–15 samples is currently used during smoothing. The two spectra are then converted to decibel scale, normalized so that the dc term is at 0 dB, and subtracted from each other. The resulting difference curve is a representation of the transponder's magnitude response in dB. Because the reference data signal has spectrum nulls at ±R, the gain response recovery will be less accurate in the immediate vicinity of these nulls. The recovered gain response can be further analyzed using curve fitting tools, and typical parameters such as tilt, ripple, and the 3 dB bandwidth can be measured. A similar algorithm is used to obtain the phase response of the device under test.

Figure 5B:
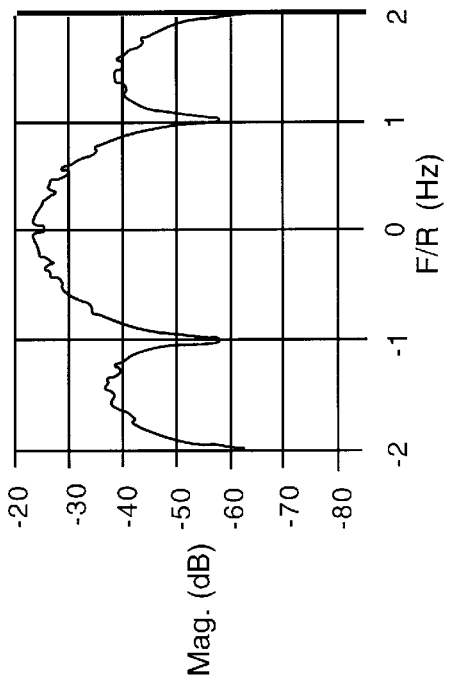
FIG. 5B illustrates the corresponding smooth envelope.
Figure 6B:
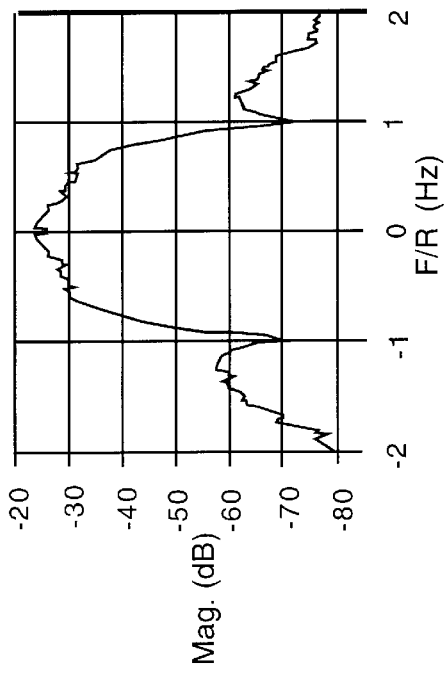
FIG. 6B illustrates the corresponding smoothed envelope.
Figure 5A:
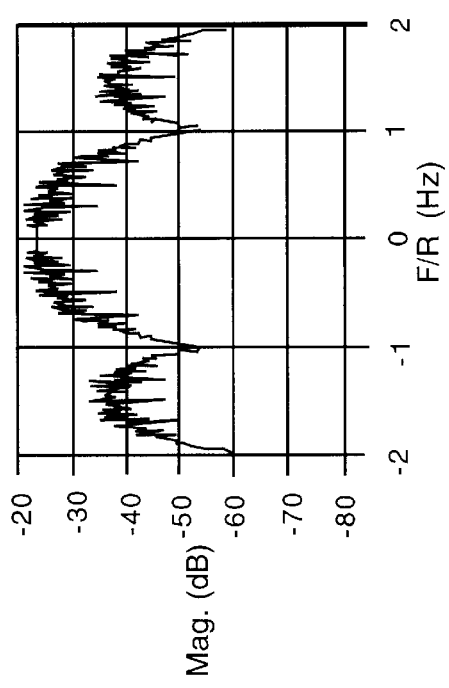
FIG. 5A illustrates the FFT of PN127 data sequence (Rate R)
Figure 6A:
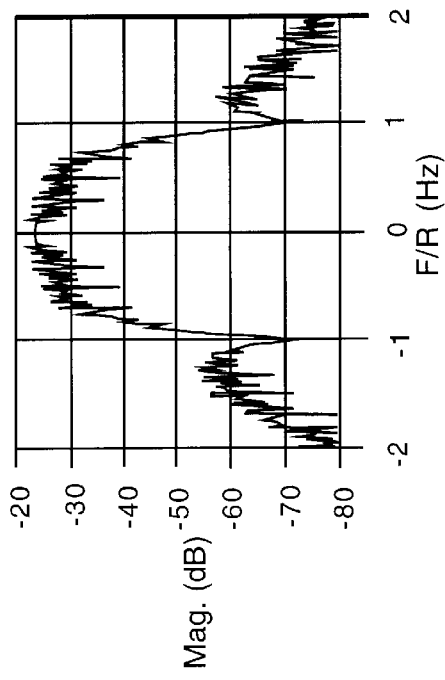
FIG. 6A illustrates the FFT of filter output.
Figure 7A:
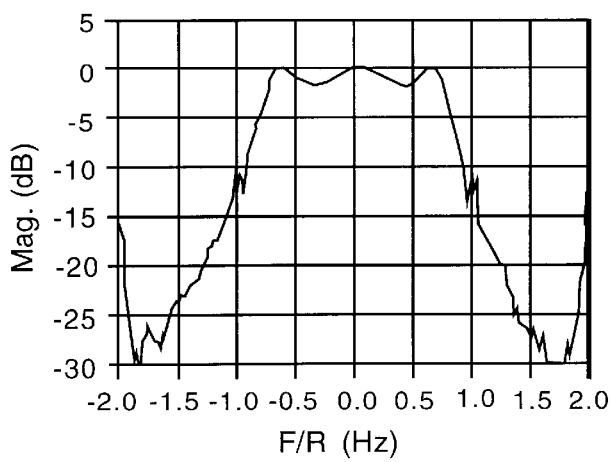
FIG. 7A illustrates the recovered response (difference of the smoothed envelope of FIGS. 5B and 6B)
Figure 7B:
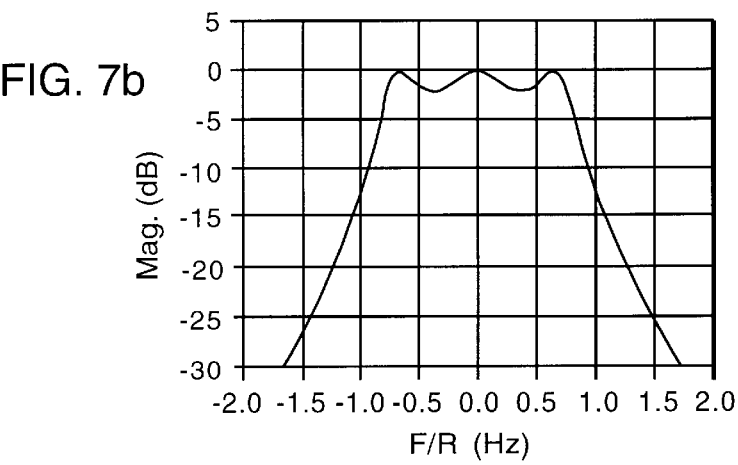
FIG. 7B illustrates the actual response of 1.5R (Chebyshev BPF (2 dB ripple)

To demonstrate the above, FIGS. 5–7 illustrate various steps along the magnitude response recovery for a sample Chebyshev bandpass filter (bandwidth I.5R, 2 dB ripple) as the device under test. All magnitudes shown are in dB. The frequency range shown is ±R Hz. The following results were obtained from simulated data. In FIG. 5A is a fast Fourier transform (FFT) of PN 127 data sequence (rate R), and FIG. 5B is a corresponding smoothed envelope. FIG. 6A is a fast fourier transform of the first filter output, and FIG. 6B is a plot of the smoothed envelope. The slight deviations at the ±F/R Hz locations in the recovered response are a normal consequence of the algorithm. They are the result of the input data spectrum having nulls at these locations.

SAMPLE RESULTS

Figure 8:
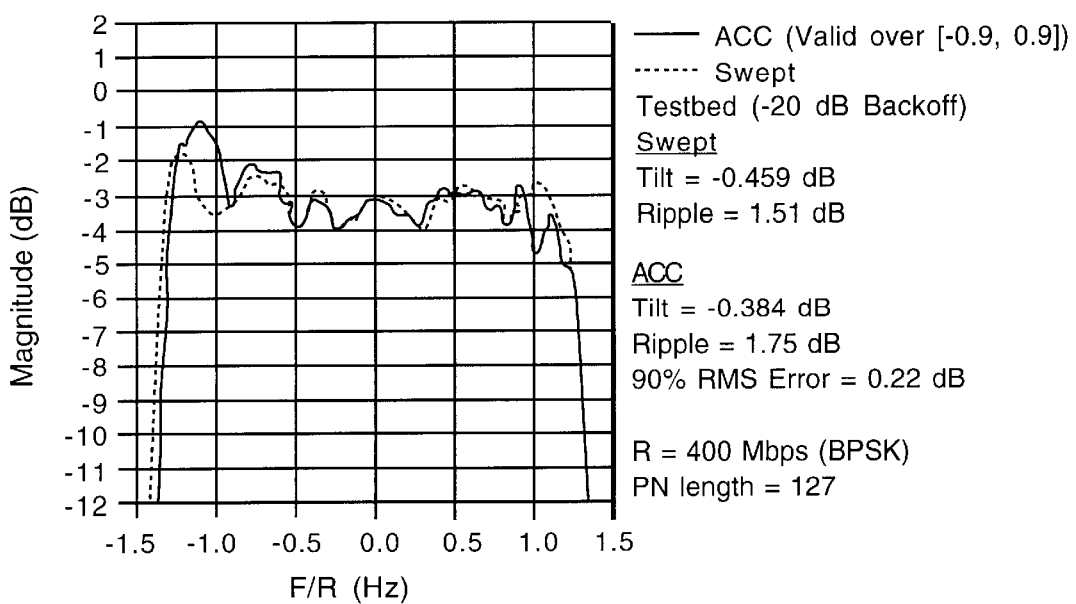
FIG. 8 illustrates, based on actual signals collected on a testbed, the testbed magnitude response at −20 dB backoff.
Figure 9:
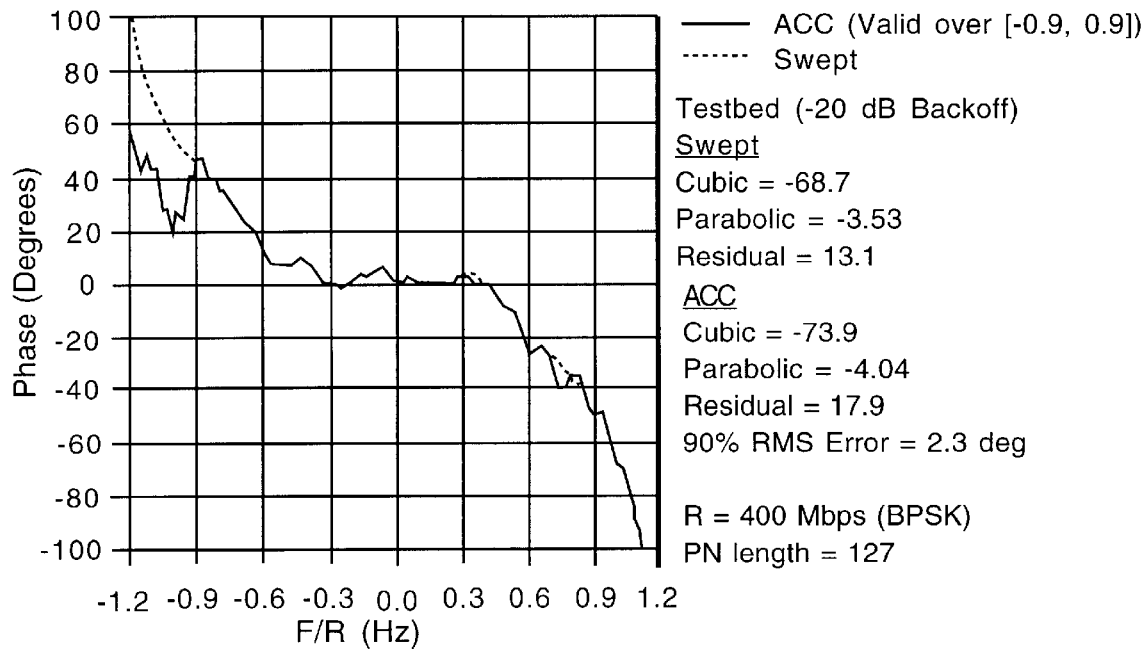
FIG. 9 illustrates the testbed phase response at −20 dB backoff.

The magnitude and phase response results in this section were obtained in the lab by testing over an 800 MHz transponder testbed which included a TWTA. To validate the technique, measurements were made at −20 dB backoff from saturation where the TWTA operates linearly. Results obtained at this operating point should match those obtained via conventional means (tone sweep). As shown in FIGS. 8 and 9, the ACC magnitude and phase response measurements closely agree with the swept tone measurements. Due to the spectrum roll-off at ±R associated with BPSK modulation, the measurement is only valid over the range [−9R, 0.9R]. An RMS difference between the swept and ACC measured responses was computed over this range (90% of null to null BW) and is also displayed. Typical RMS errors (compared to swept) using this technique have been in the range of 0.25 dB for magnitude response, and 3 degrees for phase response. Refinements in the processing algorithms and advances in A/D technology are expected to improve the accuracy of the ACC device even further.

Figure 10:
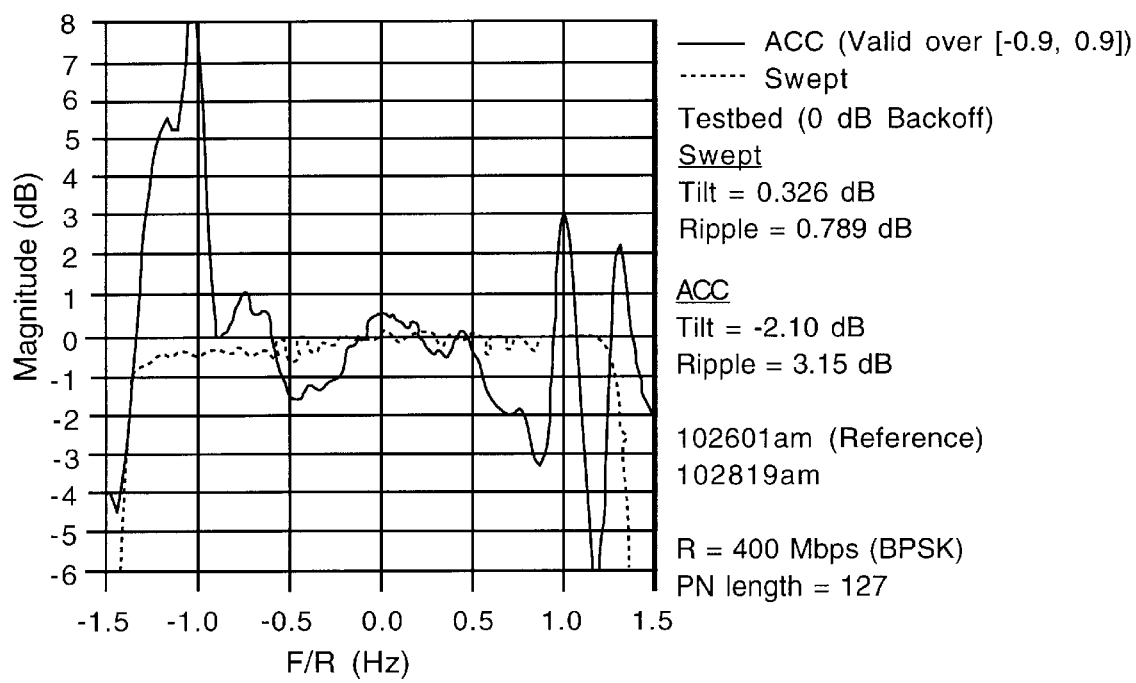
FIG. 10 illustrates the testbed magnitude response at 0 dB backoff (TWTA saturation).

FIG. 10 shows the magnitude response measurement obtained when the TWTA operating point is moved to saturation. While the swept response becomes flat—a result known to be incorrect—the measurement obtained using the ACC technique indicates the apparent testbed response. A significant amount of ripple and tilt appear to now be present across the band. The discontinuities at ±1.0F/R Hz are again the result of nulls present in the input signal spectrum.

In summary, a new technique has been disclosed for characterizing saturated Ka band satellite transponders by using a linearized equivalent frequency response dependent on the input signal level. This invention provides additional insight into the behavior of non-linear devices at saturation and has the potential of simplifying system level testing of transponders. Additional benefits would result from the added capability to monitor transponder age degradation on-orbit.

What is claimed is:

1. A method of measuring distortion in satellite RF transponders operated at or near saturation comprising, transmitting a wideband periodic RF signal having a known periodic pattern to said transponders on said satellite, said wideband periodic RF signal being generated by modulating the output of a PN sequence generator, receiving wideband periodic RF signals at said transponder which retransmits the wideband periodic RF signals, downconverting said relayed said relayed wideband periodic RF signals to baseband inphase (I) and quadrature phase (Q) signal components, converting said I and Q signal components to I and Q digital signal components and storing said I and Q digital signal component in computer memory, and performing one or more of the following measurements on the stored I and Q digital signal components:
Magnitude and phase response
AM/AM and AM/PM
Phase noise
Bit error rate
Data asymmetry
I/Q channel imbalance.

2. An apparatus for measuring distortion in Ka band RF transponders which are onboard an orbiting satellite and operated at or near saturation comprising, means for transmitting a wideband RF signal having a known periodic pattern to said transponder on said orbiting satellite, a PN sequence generator said wideband RF signal being generated by modulating the output of said PN sequence generator, means for receiving wideband RF signals at said transponder which retransmits the wideband RF signals, means for downconverting the relayed wideband RF signals to baseband inphase (I) and quadrature phase (Q) signal components, means for converting said I and Q signal components to I and Q digital signal components and storing said I and Q digital signal component in a computer memory, and means for performing one or more of the following measurements on the stored I and Q digital signal components:
Magnitude and phase response
AM/AM and AM/PM
Phase noise
Bit error rate
Data asymmetry
I/Q channel imbalance.

3. A method of measuring distortion in an RF network comprising, transmitting a wideband periodic RF signal having a known periodic pattern modulated thereon to said wideband RF network, said known periodic pattern being generated by a PN sequence generator, passing said wideband RF signals having a known periodic pattern through said network and outputting a measurement signal, down converting and digitizing said measurement signal to inphase (I) and quadrature (Q) digital signal components and storing said I and Q digital signal component in computer memory, and performing one or more of the following measurements on the stored measurement I and Q digital signal components:
Magnitude and phase response
AM/AM and AM/PM
Phase noise
Bit error rate
Data asymmetry
I/Q channel imbalance.

4. Apparatus for measuring distortion in an RF network comprising, means for transmitting a wideband RF signal having a known periodic pattern to said RF network, said known periodic pattern being generated by a PN sequence generator, means for passing said wideband RF signals through said network and outputting a measurement signal, means for converting and digitizing said measurement signal to inphase (I) and quadrature (Q) digital signal components and storing said I and Q digital signal component in computer memory, and means for performing one or more of the following measurements on the stored measurement I and Q digital signal components:
Magnitude and phase response
AM/AM and AM/PM
Phase noise
Bit error rate
Data asymmetry
I/Q channel imbalance.

5. A method for performance characterization of Ka band transponders comprising passing a wideband RF signal through the Ka band transponder, said wideband RF signal having a periodic test pattern modulated thereon, and downconverting output of said transponder to inphase (I) AND QUADRATURE (Q) phase baseband signals digitizing said I and Q signals and measuring one or more of the following characteristics:

Magnitude and phase response
 AM/AM and AM/PM
 Phase noise
 Bit error rate
 Data asymmetry
 I/Q channel imbalance.

6. The method defined in claim 5 wherein periodic test pattern is generated by a pseudo-noise (PN) sequence generator.

7. Apparatus for performance characterization of Ka band transponders comprising means for passing a wideband RF signal to a K band transponder, said wideband RF signal including a periodic test pattern modulated thereon, means for downconverting outputs of said Ka band transponder to inphase (I) and quadrature (Q) phase band signals, means for digitizing said I and Q signals and means for measuring one or more of the following characteristics from said I and Q signals:
 Magnitude and phase response
 AM/AM and AM/PM
 Phase noise
 Bit error rate
 Data asymmetry
 I/Q channel imbalance.

\* \* \* \* \*

UNITED STATES PATENT AND TRADEMARK OFFICE
CERTIFICATE OF CORRECTION

PATENT NO.     : 6,411,797 B1
DATED          : June 25, 2002
INVENTOR(S)    : Estinto, Eugene It is certified that error appears in the above-identified patent and that said Letters Patent is hereby corrected as shown below:

Title page,
Item [*] Notice, delete "0" and insert -- 796 --.

Signed and Sealed this

Thirtieth Day of August, 2005

JON W. DUDAS
*Director of the United States Patent and Trademark Office*